United States Patent [19]

Hager

[11] 4,324,994
[45] Apr. 13, 1982

[54] DRIVE UNIT WITH A MOTOR

[75] Inventor: Horst Hager, Paderborn, Fed. Rep. of Germany

[73] Assignee: Hightrack Computer Technik GmbH, Berlin, Fed. Rep. of Germany

[21] Appl. No.: 134,923

[22] Filed: Mar. 28, 1980

[30] Foreign Application Priority Data

Apr. 2, 1979 [DE] Fed. Rep. of Germany ....... 2913602

[51] Int. Cl.³ ............................................. H02K 11/00
[52] U.S. Cl. .................. 310/68 R; 310/268; 310/156
[58] Field of Search ...................... 310/68 R, 268, 156

[56] References Cited

U.S. PATENT DOCUMENTS 3,189,770  6/1965  Henry-Boudot .................... 310/156
3,988,024  10/1976  Watanabe et al. ............... 310/268 X Primary Examiner—Donovan F. Duggan
Attorney, Agent, or Firm—Michael J. Striker

[57] ABSTRACT

A direct-current motor unit has a direct-current motor with a stationary armature winding and a rotatable ring-shaped multipolar permanent magnet, a plurality of conductors connecting electric supply elements to the electric motor, and a stationary plate member on which the armature winding and the connecting conductors are arranged and together formed as a common printed circuit.

8 Claims, 3 Drawing Figures

DRIVE UNIT WITH A MOTOR

BACKGROUND OF THE INVENTION

The present invention relates to a drive arrangement or unit with a direct-current motor which has at least one ring-shaped multipolar permanent magnet and one disc-shaped armature provided with an armature winding with conductors at both sides of the armature.

Drive units or arrangements of the above-mentioned general type are known in the art. In a known arrangement, a permanent magnet rotates relative to the armature, whereas the armature with the armature winding is stationary and pierced by a magnetic field. The known arrangements possess some disadvantages in that they do not have sufficiently compact construction and are not sufficiently simple to manufacture.

SUMMARY OF THE INVENTION

Accordingly, it is an object of the present invention to provide a drive unit or arrangement with a known motor, which has a compact construction and is simple to manufacture.

In keeping with these objects and with others which will become apparent hereinafter, one feature of the present invention resides, briefly stated, in a direct current motor unit including a direct-current motor with a stationary winding and a ring-shaped multi-polar rotatable permanent magnet, and a plurality of electric elements arranged to electrically cooperate with the motor and spaced from the latter, wherein the armature winding and connectiing conductors which connect the motor with the electric elements are arranged on a plate member and formed as a common printed circuit. When the drive unit is constructed in accordance with the present invention the electrical connection between the motor and the circuit required for its current supply can be produced rationally and without difficulties, and in addition has a long service life and is reliable.

The novel features which are considered as characteristic for the invention are set forth in particular in the appended claims. The invention itself, however, both as to its construction and method of operation, together with additional features and advantages thereof, will be best understood from the following description of specific embodiments when read in connection with the accompanying drawings.

BRIEF DESCRIPTION OF THE DRAWINGS

FIG. 3 is a view substantially corresponding to the view of FIG. 2 but showing another embodiment the present invention with a two layer plate member.

DESCRIPTION OF A PREFERRED EMBODIMENT

Figure 1:
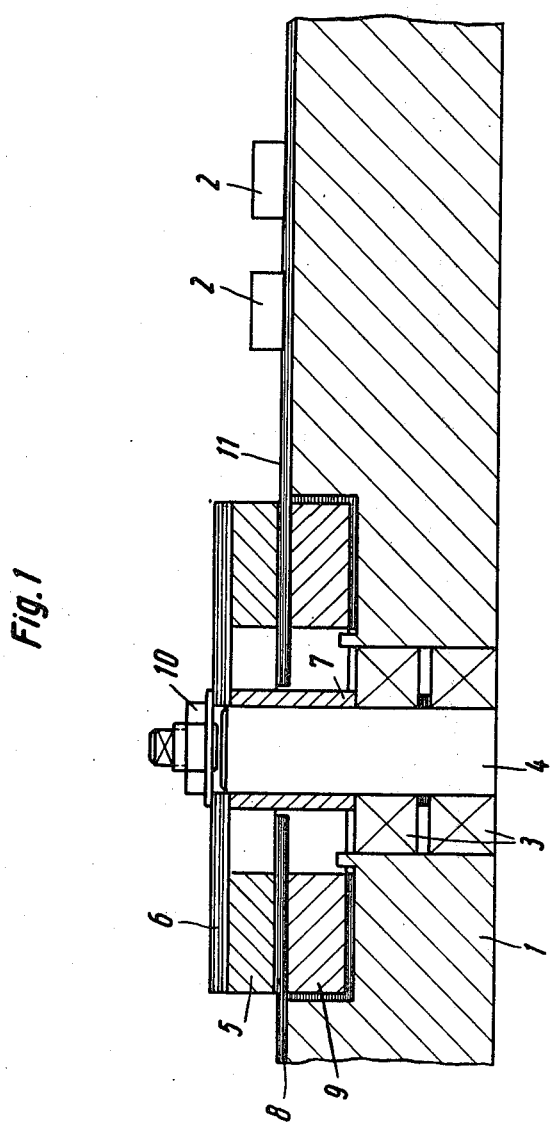
FIG. 1 is a view showing a section of a drive arrangement with a direct current motor in accordance with the present invention.

A drive arrangement or unit in accordance with the present invention has a base plate 1 which carries a direct-current motor and electric structural elements 2 provided for controlled current supply of the motor in predetermined manner.

The base plate 1 has a hole in which two bearings 3 are provided for rotatably supporting a shaft 4. The shaft 4 transmits rotary movement obtained from the motor to a further element for example a plate packet of a magnetic disc memory. The direct current motor has a ring-shaped magnet 5 and a closing member 6 for the same which are fixedly connected with the shaft 4 for joint rotation therewith. A bush 7 is arranged on the shaft 4 and provides for a constant distance between the ring-shaped magnet 5 and an armature plate 8 which is arranged on the base plate 1. The armature plate 8 may be mounted on the base plate 1 by screws.

A recess is provided in the base plate 1 beneath the armature plate 8. A magnetic closing member 9 is located in this recess opposite to the ring-shaped magnet 5. The closing member 9 is wound of a band of magnetic material, and glued in the base plate 1. The ring-shaped magnet 5 has, for example, eight permanent magnets with respectively alternating polarities. A nut 10 provides for fixed connection between the shaft 4 and the ring-shaped magnet 5 as well as the closing member 6.

The armature plate 8 is composed of electrically insulating material and provided at its both sides with printed conductors. In the region of the motor, that is between the ring-shaped magnet 5 and the closing member 9, the printed circuit forms an armature winding of the motor. The printed circuit extends outwardly beyond the region of the motor and forms connecting conductors 11 between the armature winding and the structural elements 2 as well as the connection of the structural elements 2 with one another. When current flows through the stationary armature winding, torque acts upon the rotatable ring-shaped magnet 5 and is transmitted from the magnet 5 to the shaft 4.

Figure 2:
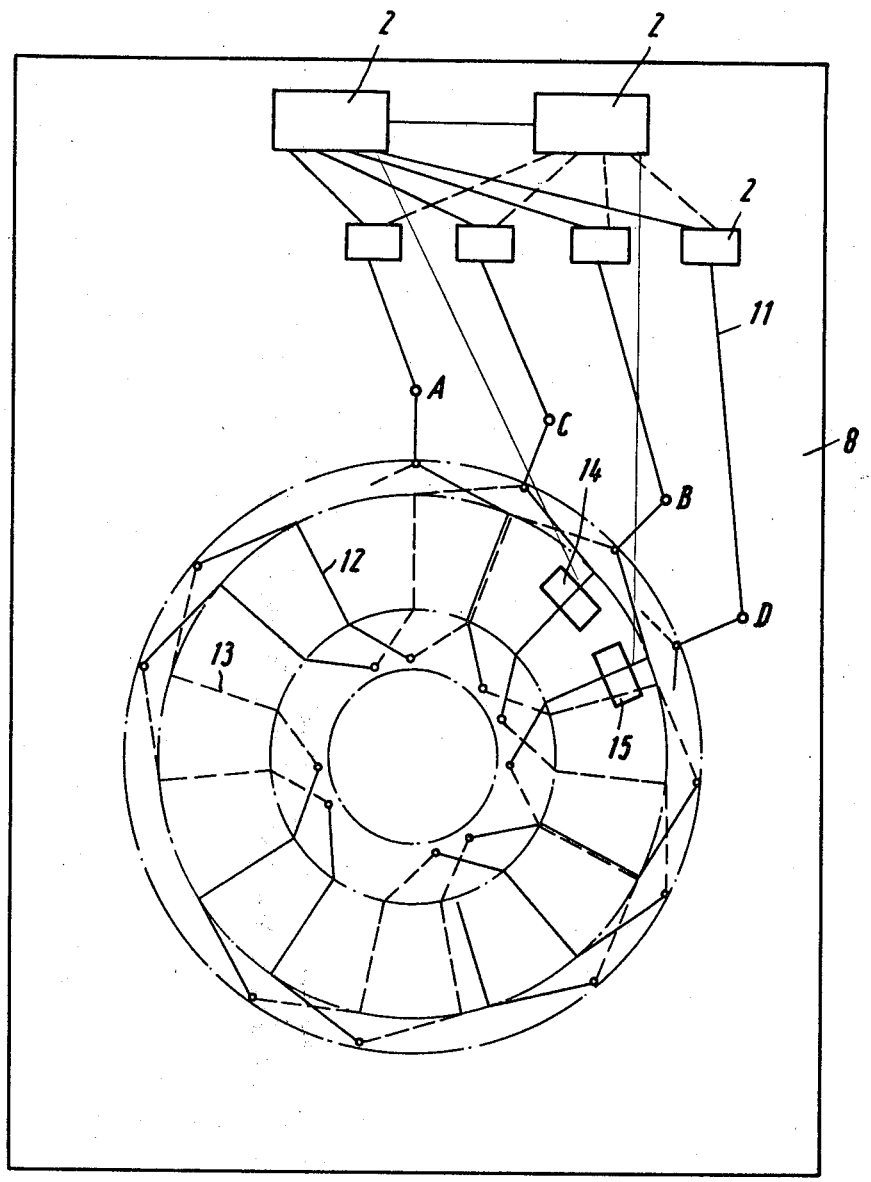
FIG. 2 is a plan view showing a printed circuit with a part of a winding of a disc-shaped armature and connecting conductors between the motor and its current supply elements.

FIG. 2 shows a part of the printed armature winding which is composed of a plurality of armature turns connected in series. For example, 254 conductors are provided at both sides of the armature plate 8 which conductors are pierced by magnetic field generated by the ring-shaped magnet 5. Some of the conductors such as a conductor 12 extends over the upper face, whereas the other of the conductors such as a conductor 13 extends over the lower face of the armature plate 8. The connection between the conductors on the upper face and the lower face is performed via throughgoing apertures in the armature plate 8. The armature plate 8 may be composed of two layers as shown in FIG. 3. The upper conductors 12 may be arranged in the upper layer 8' and the lower conductors 13 may be arranged in the lower layer 8" of such plate.

The outer connecting points A, B, C and D of the armature winding are connected with a respective one transistor circuit. The latter serves for conducting current impulses of controlled in predetermined manner polarity and duration through the armature winding. The structural elements 2 serve for current supply and control of the transistor circuits.

In order to obtain a rotary field particularly with a fast and controllable start, the armature winding is supplied with two phases. The connecting points A and B which are offset relative to one another by 45° serve for supplying the first phase. The connecting points C and D are offset relative to one another also by 45° and relative to the connecting points A and B by 22.5° and serve for supplying the second phase.

The phase control is performed with the aid of two Hall generators 14 and 15 which are offset relative to one another by 22.5°. The outlet signals of the Hall generators 14 and 15 depend upon the respective position of the ring-shaped magnet 5. Eight phase shifts are carried out for example during each revolution of the ring-shaped magnet 5. Further connecting conductors connect the Hall generators 14 and 15 with the structural elements 2. They also may form a part of the printed circuit provided on the armature plate 8.

In order to adjust the rotation speed, the outlet signals of the Hall generators 14 and 15 or of other impulse generators can be utilized. The supply of the motor can be performed by supply impulses of constant amplitude, whereas the duration of impulses may be controlled in dependence upon the rotary speed of the motor.

In will be understood that each of the elements described above, or two or more together, may also find a useful application in other types of constructions differing from the types described above.

While the invention has been illustrated and described as embodied in a direct current motor unit, it is not intended to be limited to the details shown, since various modifications may be made without departing in any way from the spirit of the present invention.

Without further analysis the following will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A direct-current motor unit, comprising a direct current motor including a stationary armature winding and a ring-shaped multipolar permanent magnet rotatable relative to said stationary winding so that a magnetic field extends through the latter; a plurality of elements arranged to electrically cooperate with said motor and spaced from the latter; a plurality of conductors connecting said elements to said electric motor; and a stationary plate member on which said armature winding and said connecting conductors are arranged and together formed as a common printed circuit, said stationary plate member having a first portion which is located substantially in the region of said magnet and on which said armature winding is arranged, and a second portion which extends outwardly of the region of said magnet and on which said connecting conductors are arranged.

2. A direct-current motor unit as defined in claim 1, wherein said first portion of said plate member is disc-shaped, said armature winding being provided on said first disc-shaped portion.

3. A direct-current motor unit as defined in claim 2, wherein said first disc-shaped portion of said plate member has lower and upper surfaces, said armature winding having a plurality of lower winding conductors arranged on said lower surface and a plurality of upper winding conductors arranged on said upper surface of said first disc-shaped portion.

4. A direct-current motor unit as defined in claim 1, wherein said plate member has lower and upper surfaces, said armature winding having a plurality of lower and upper winding conductors, said connecting conductors including a plurality of lower and upper connecting conductors, said lower winding and connecting conductors being arranged on said lower surface whereas said upper connecting conductors are arranged on said upper surface of said plate member.

5. A direct-current motor unit as defined in claim 4, wherein said plate member has two layers, said lower winding and connecting conductors being arranged in one of said layers whereas said upper winding and connecting conductors are arranged in the other of said layers.

6. A direct-current motor unit as defined in claim 5, wherein said plate member is provided with a plurality of through-going openings through which each of said upper conductors is connected with a respective one of said lower conductors.

7. A direct-current motor unit as defined in claim 1, wherein said elements are operative for supplying and controlling said motor and arranged on said plate.

8. A direct-current motor unit as defined in claim 1; and further comprising a plurality of Hall generators operative for controlling respective positions of said rotatable permanent magnet and connected with the latter, and a plurality of further connecting conductors which connect said Hall generators with said elements, said further connecting conductors being a part of said printed circuit.

* * * * *